Nov. 16, 1926.
E. BROWN
COMPRESSOR
Filed Jan. 20, 1926
1,607,234
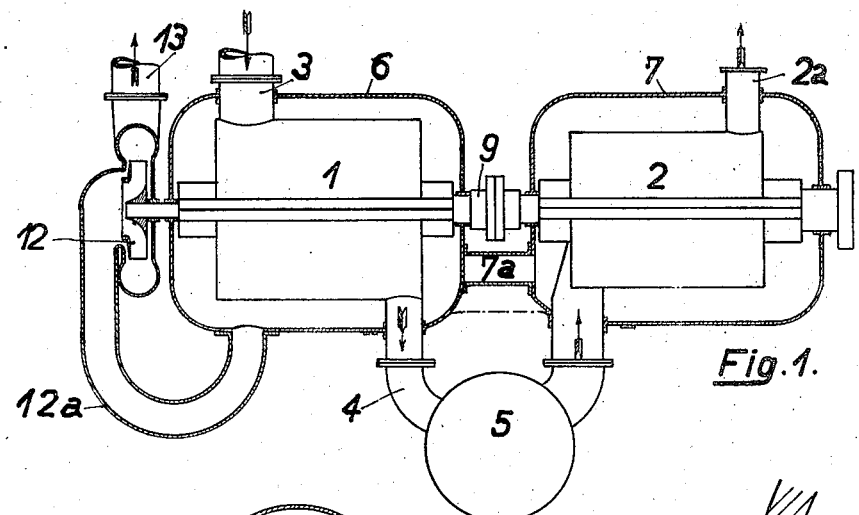
Fig.1.
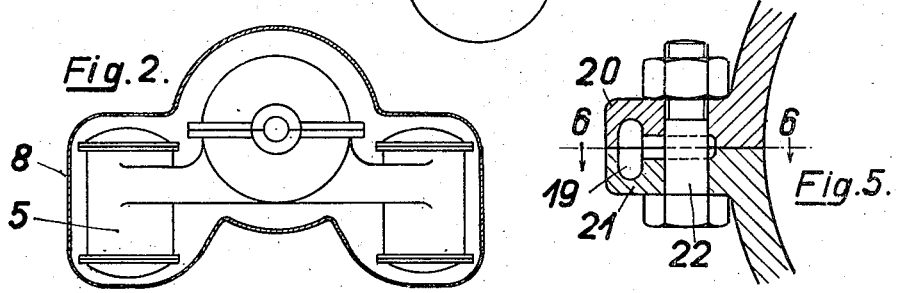
Fig.2.
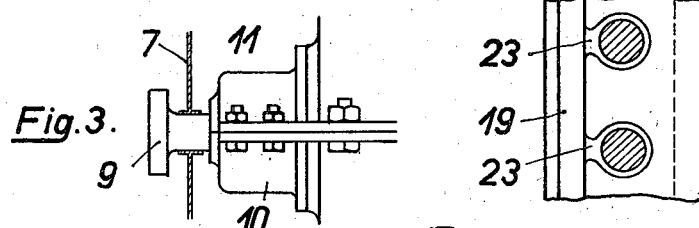
Fig.3.
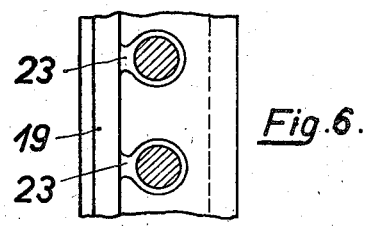
Fig.5.
Fig.6.
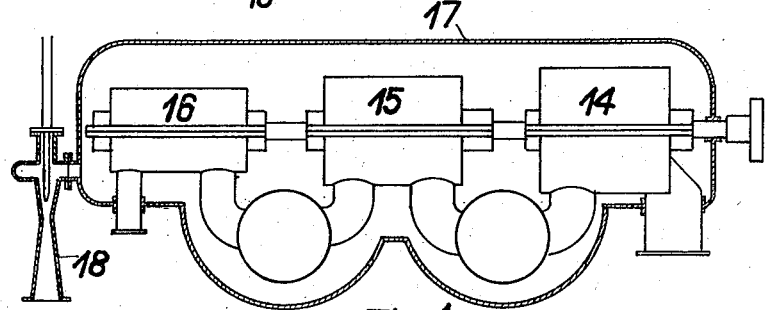
Fig.4.
Eric Brown,
Inventor
By
Attorneys.

Patented Nov. 16, 1926.

1,607,234

UNITED STATES PATENT OFFICE.

ERIC BROWN, OF BADEN, SWITZERLAND, ASSIGNOR TO AKTIENGESELLSCHAFT BROWN, BOVERI & CIE., OF BADEN, SWITZERLAND, A JOINT STOCK COMPANY OF SWITZERLAND.

COMPRESSOR.

Application filed January 20, 1926, Serial No. 82,559, and in Germany January 16, 1925.

This invention relates generally to fluid compressors and has particular application to compressors of the rotary or turbine type, as distinguished from the reciprocating type.

The general purpose of the invention is the provision of an improved construction for apparatus of this kind, which is designed to prevent the escape of gases, vapour or other fluids from the compressor chambers into the room in which the apparatus is operated.

Another object of the invention is the provision of apparatus effective to prevent loss of fluid which may escape from the compressor chambers.

Other and further objects of the invention will be pointed out hereinafter, indicated in the appended claims or obvious to one skilled in the art upon an understanding of the present disclosure.

Where the conditions as to volume and pressure permit, the compression of gases and vapour may be carried on most advantageously by compressors of the rotary or turbine type. An example of such use is found in large refrigerating plants. The use of rotary compressors is attended, however, with possibilities of leakage which do not exist in the use of compressors of some other types, and in the handling of certain substances, for example, ethyl-chloride, methyl-chloride and ammonia, such leakage is likely to hold possibility of danger or injury to health of persons subjected to the escaped gases.

One of the sources of possible leakage in compressors of this type is the extensive joint or joints between sections of the compressor chamber.

The present invention provides an absolute safeguard against escape or loss of gases and the like from the compressor chamber into the atmosphere by the provision of suitable chambers or conduits enveloping or intersecting the joints, in which chambers or conduits a sub-atmospheric pressure is maintained, via suitable exhaust or withdrawal connections, whereby any gases or vapours escaping through the joints are conducted away.

One of the great practical advantages of the invention resides in the fact that it attains the desired security against leakage without requiring hermetically tight joints in either the compressor casing or the exhaust chamber.

For purpose of presentation I show and describe herein certain arrangements in which the invention may be embodied, but it is to be understood that these are presented for purpose of illustration only, and are not to be accorded any interpretation having the effect of limiting the invention claimed, short of its true and most comprehensive scope in the art.

In the accompanying drawing forming a part of this specification,

Fig. 1 is a diagrammatic illustration of an installation, showing the compressor chambers in elevation and the exhaust housings in sectional elevation;

Fig. 2 is a diagrammatic illustration in the nature of a transverse sectional elevation of a slightly different installation;

Fig. 3 is a detail showing diagrammatically the association of the exhaust housings with a shaft;

Fig. 4 is a diagrammatical longitudinal sectional elevation of a modified construction;

Fig. 5 is a detail illustrating still another modified construction, the same being in the nature of a transverse section through joint portions of the compressor casing; and Fig. 6 is another detail of the construction shown in Fig. 5, same being a section on line 6—6 of said figure.

The nature of the invention will be most quickly understood by immediate reference to the illustrated embodiments. Let it be understood that the reference numeral 1 designates the compressor casing of a two-stage rotary compressor, the casing of the second compressor being designated by the numeral 2. The fluid to be compressed is fed to the casing 1 through the conduit 3 and is discharged through the conduit 4 to a cooling or radiating device 5 intermediate the two compressors. From this the fluid passes to the second stage compressor 2 whence it is discharged via the conduit $2^a$.

It will be observed that the compressor casings are formed of semi-cylindrical sections connected with flange joints and formed to accommodate passage of the compressor shaft longitudinally through them on their horizontal axes. The respective compressor casings are enclosed by exhaust casings 6 and 7 which fit tightly the conduits and shaft mountings which extend there-through and which are in communication through a connection 7ª. The intermediate cooler 5 may be likewise housed in an exhaust casing having communication with the compressor housing, as illustrated in Fig. 2.

The exhaust casings in which the portions of the compressor system are thus enclosed should be as tight as possible, although they need not be hermetically sealed. An exhaust fan 12 is provided to maintain a sub-atmospheric pressure within the exhaust casings, said fan having communication with the casings by way of the conduit 12ª and discharging through the conduit 13 to a stack or to a condensing or separating apparatus for recovery or absorption of the gases or vapours withdrawn from the exhaust casing. It is obvious that the fan 12 may be driven independently of the compressor, or that in cases where the suction branch of the compressor is maintained below atmospheric pressure, the sub-atmospheric pressure in the exhaust casing may be maintained by the compressor itself through the medium of proper connections from the exhaust casing to the inlet side of the compressor.

In the form illustrated in Fig. 4, the several compressors are enclosed within a unitary exhaust casing 17, in which a sub-atmospheric pressure is maintained by an ejector pump 18.

In the use of such an ejector device, the actuating fluid utilized may be of a suitable nature to absorb or dissolve the gases or vapours extracted from the exhaust chamber, e. g. water may be employed effectively when the compressed fluid is ammonia, and the ammonia subsequently recovered.

Fig. 3 is intended to illustrate the fact that no special expedients need be resorted to for the purpose of forming hermetic joints between the exhaust casings and parts extending therethrough, it being contemplated that the action of the exhausting means be adequate to take care of any air leakage through joints which are tight within the range of good shop practice.

In the form illustrated in Figs. 5 and 6, the exhaust chambers or conduits are formed in the flanges of the compressor casings in conjunctive association with the joints at the junction casing parts. Here the numerals 20 and 21 designate the casing flanges and the numeral 19 designates grooves or channels formed therein in such fashion as to afford closed conduits when the casing sections are assembled. Extensions 23 of these channels may be made to circumscribe the bolt holes in which the connecting bolts 22 are fitted. The system of channels 19 thus formed in conjunction with the joints of the casing is connected in suitable fashion to the exhausting means, so that a desired sub-atmospheric pressure may be maintained in the channels and any gases or vapours which leak through the joints may be conveyed to the desired point of disposal without being released into the atmosphere about the machine.

What I claim is:—

1. Compressor apparatus comprising the combination with a compressor operating to compress a fluid to super-atmospheric pressure and including a pressure confining casing having joints, of a chamber communicating with the joints of the casing and means for exhausting the chamber to a pressure below that in the compressor casing.

2. Compressor apparatus comprising the combination with a compressor having a casing for confining a compressed fluid, of an exhaust casing enveloping same, and means for maintaining a pressure within the exhaust casing which is less than that within the compressor casing.

3. Compressor apparatus comprising the combination with a compressor operating to produce a super-atmospheric pressure and including a casing, of an exhaust chamber enveloping the joints of the same and a pump for removing fluids from the exhaust chamber.

4. Compressor apparatus comprising the combination with a compressor for compressing fluids to a super-atmospheric pressure, said compressor having a casing, of an exhaust chamber enveloping the joints of such casing and means operating in conjunction with the compressor for exhausting gases from the exhaust chamber.

5. Compressor apparatus comprising the combination with a compressor operating to produce a super-atmospheric pressure within its casing, of an exhaust chamber enveloping the joints of the compressor casing, and means for positively withdrawing fluids from the exhaust chamber.

In testimony whereof I have hereunto subscribed my name at Zurich, Switzerland, on the 6th day of January, A. D. 1926.

ERIC BROWN.